United States Patent
Le Faucheur et al.

(10) Patent No.: US 8,391,492 B1
(45) Date of Patent: Mar. 5, 2013

(54) SECURE RESOURCE RESERVATION PROTOCOL (RSVP) WITH DYNAMIC GROUP KEYING

(75) Inventors: Francois Le Faucheur, Valbonne (FR); Luc Billot, Biot (FR); Pascal Delprat, Saint Cèzaire sur Siagne (FR); Frederick Baker, Goleta, CA (US); Brian E. Weis, San Jose, CA (US); Eric G. Vyncke, Alleur (BE)

(73) Assignee: Cisco Technology, Inc., San Jose, CA (US)

( * ) Notice: Subject to any disclaimer, the term of this patent is extended or adjusted under 35 U.S.C. 154(b) by 769 days.

(21) Appl. No.: 12/215,173

(22) Filed: Jun. 25, 2008

(51) Int. Cl.
*H04L 29/06* (2006.01)
(52) U.S. Cl. .......................... 380/277; 713/163
(58) Field of Classification Search ............. 380/277; 713/171
See application file for complete search history.

(56) References Cited

U.S. PATENT DOCUMENTS

| | | | |
|---|---|---|---|
| 6,473,858 B1 * | 10/2002 | Shimomura et al. ......... | 713/150 |
| 7,225,271 B1 | 5/2007 | DiBiasio et al. | |
| 7,457,416 B1 * | 11/2008 | Elliott ............................ | 380/256 |
| 7,519,010 B1 * | 4/2009 | Aggarwal et al. ............. | 370/254 |
| 2001/0056459 A1 * | 12/2001 | Kurose et al. ................. | 709/201 |
| 2003/0137944 A1 * | 7/2003 | Medvinsky .................... | 370/252 |
| 2005/0018853 A1 * | 1/2005 | Lain et al. ...................... | 380/277 |
| 2006/0242408 A1 * | 10/2006 | McGrew et al. ............... | 713/168 |
| 2008/0091811 A1 | 4/2008 | Wing et al. | |

OTHER PUBLICATIONS

Baugher, Mark, "MSEC Group Key Management Architecture", Apr. 2005.*

* cited by examiner

*Primary Examiner* — Gilberto Barron, Jr.
*Assistant Examiner* — David Le
(74) *Attorney, Agent, or Firm* — Hickman Palermo Truong Becker Bingham Wong LLP (57) ABSTRACT

In one embodiment, an apparatus associated with securing a Resource Reservation Protocol (RSVP) with dynamic group keying is provided. The apparatus may include a group key logic that interacts with a dynamic group key management logic. The dynamic group key management logic provides a group key to members of a set of RSVP-capable devices. The apparatus also includes an RSVP authentication logic to determine whether a received RSVP message was provided by a member of the set of RSVP-capable devices. The determination is made using implicit authorization that depends on the group key and that does not depend on a challenge/response protocol. In one embodiment the apparatus is a router.

24 Claims, 9 Drawing Sheets

SECURE RESOURCE RESERVATION PROTOCOL (RSVP) WITH DYNAMIC GROUP KEYING

TECHNICAL FIELD

This disclosure relates generally to securing the Resource Reservation Protocol (RSVP). More specifically, the disclosure relates to securing RSVP using dynamic group keying with a trusted set of RSVP devices.

BACKGROUND

The resource reservation protocol (RSVP) is a network-control protocol that enables Internet applications to request and obtain from the network differing qualities of service (QoS) for their data flows. Some applications have different network performance requirements and thus desire different QoS. RSVP is not a routing protocol but rather works in conjunction with routing protocols to install the equivalent of dynamic reservations along the routes that the routing protocols calculate. However, not every internet device (e.g., router, server) along a route may be RSVP capable.

In RSVP, a data flow is a sequence of datagrams that have the same source, destination, and QoS requirements. The QoS requirements are communicated in RSVP through a network using a flow specification. A flow specification is a data structure that describes the level of service required for a flow. The levels of service may include, for example, delivery with reasonable delay and loss (controlled load service) or delivery with guaranteed delay bounds (guaranteed service), and so on. Thus, RSVP is seen to be a network layer protocol that enables a network to provide differentiated levels of service to specific flows of data.

RSVP authentication relies on a security hash that is included in an RSVP message. The security hash facilitates neighbor authentication and replay protection. The goal of the RSVP security hash is to block unauthorized internet devices (e.g., router, host) from taking undesirable actions. The undesired actions may include, for example, injecting an unauthorized RSVP message, modifying an RSVP message in an unauthorized way, and so on. To use a security hash, an RSVP enabled device (e.g., server) needs a key. These keys need to be distributed. Conventional key distribution methods include manual distribution, a pair-wise key management protocol, and so on. Manual distribution may become burdensome if keys are changed frequently and/or if the set of devices to which keys are to be distributed is large. A pair-wise key management protocol may not be appropriate due to complexity and/or operational burden. Thus, issues associated with conventional key distribution methods may reduce the likelihood that RSVP authentication and security are employed.

RSVP uses a hop-by-hop model where, by design, a hop may process and modify the contents of an RSVP message. A hop may also perform local admission control and resource reservation. However, the "per-neighbor" key approach for RSVP authentication and security does not work when there may be an IP (internet protocol) hop between two RSVP neighbors. For example, if an end-to-end route includes both RSVP-capable and non-RSVP-capable routers, the per-neighbor key approach will not work because for some RSVP messages (e.g., Path), an RSVP device does not have information about the next RSVP hop for the message at the time the message is to be forwarded. In another example, an end-to-end route may include an RSVP device that is not configured and/or intended to be involved in RSVP security. The next RSVP hop may not be known by an RSVP device at the time of forwarding some RSVP messages because the purpose of such messages may be to discover the next RSVP hop, to dynamically rediscover the next RSVP hop after a routing change, and so on. If an RSVP device does not know the next RSVP hop for an RSVP message, then the RSVP device may not know which security association to employ when forwarding the RSVP message and in turn which per-neighbor key to use.

BRIEF DESCRIPTION OF THE DRAWINGS

In the accompanying drawings, which illustrate various embodiments, it will be appreciated that the illustrated element boundaries (e.g., boxes, groups of boxes, or other shapes) are representative and not limiting. One of ordinary skill in the art will appreciate that in some embodiments one element may be designed as multiple elements, that multiple elements may be designed as one element, that an element shown as an internal component of another element may be implemented as an external component and vice versa, and so on. Furthermore, elements may not be drawn to scale.

OVERVIEW

In one embodiment a group key is provided to a set of RSVP devices (e.g., routers, servers) in a trusted group. Members of the set of RSVP devices selectively process RSVP messages based, at least in part, on the key. Distributing the key to a trusted group of RSVP devices mitigates issues associated with an RSVP device not knowing the next RSVP-hop because an RSVP device can apply a cryptographic transform to a message even when it does not know the next RSVP-hop. The cryptographic transform may be one or more of a signature, message encryption, or message integrity operation. The RSVP device can apply a cryptographic transform to the message because the same key is available to all members of the trusted group. While a single key is described, it is to be appreciated that the key distribution may involve a set of keys. For example, a first key may be associated with encryption, a second key may be associated with message integrity, and so on. The key distribution may be performed using dynamic key management built on a dynamic group keying infrastructure. The dynamic group keying infrastructure may be, for example, Group Controller/Key Server as defined by the Internet Engineering Task Force (IETF) multicast security (MSEC) group. The dynamic key management may include authenticating RSVP devices in the trusted group and distributing up-to-date key information (e.g., data encryption key, data integrity key) to authorized RSVP devices. The distributed up-to-date key information may be used by RSVP devices for messages including unicast messages, broadcast messages, multicast messages, and so on.

Since the group key is only distributed to authorized devices that are members of the trusted group, the key functions as a group key that facilitates maintaining the security requirements of RSVP. These security requirements include ensuring that only authorized RSVP devices issue and/or modify RSVP messages. Thus, in summary, dynamic group keying is combined with RSVP security mechanisms, even in mixed environments where there are RSVP-capable devices and non-RSVP-capable devices. Note that no additional control packets (e.g., challenge/response) are required to be sent between members of the trusted group when the dynamic group keying is employed. Instead, RSVP devices accept that a group member who possesses a correct group key has been authenticated and is an authorized peer. This approach may be referred to as an implicit authorization approach in reference to the lack of a challenge/response approach.

Recall that RSVP uses a hop-by-hop model. Recall also that a hop may process and modify the content of RSVP messages, perform local admission control, and perform resource reservation. Securing RSVP with dynamic group keys relies on a set of RSVP devices acting as a trusted group whose members are trusted to perform appropriate RSVP processing, to do appropriate admission control, and to perform appropriate resource reservation. Members of the trusted group are also trusted to not disrupt or destroy the integrity of the trusted group.

DESCRIPTION OF EXAMPLE EMBODIMENTS

Figure 1:
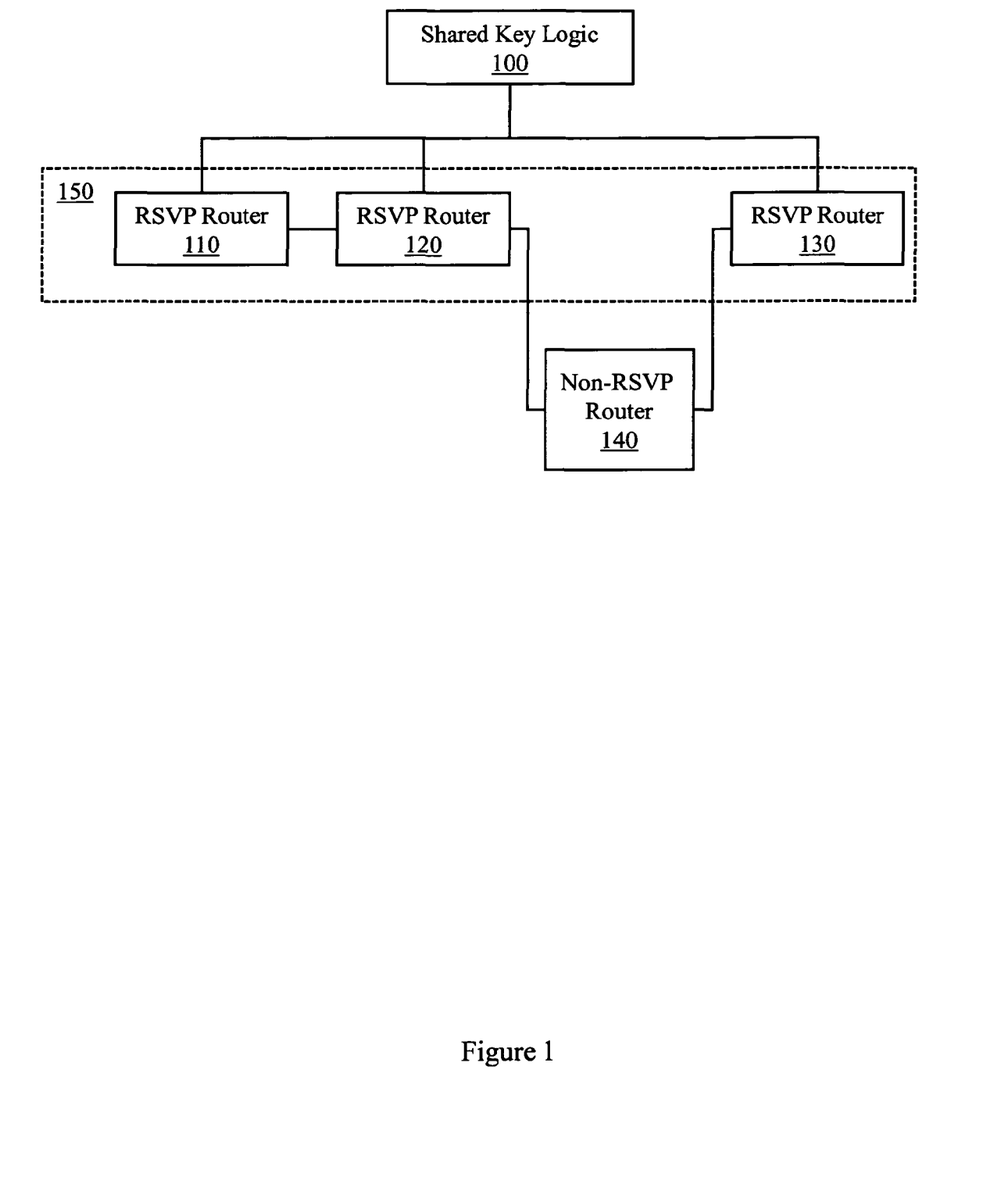
FIG. 1 illustrates a set of routers that includes both RSVP-capable routers and non-RSVP-capable routers.

Example embodiments concern securing RSVP with dynamic group keying. The securing is performed in an environment where a set of RSVP-capable routers may interact with non-RSVP-capable routers and/or with RSVP-capable routers that are not part of a trusted group or that are not configured with RSVP security. FIG. 1 illustrates an example arrangement of RSVP-capable routers interacting with a non-RSVP-capable router 140. A shared key logic 100 is illustrated providing dynamic group key management for members (e.g., 110, 120, 130) of a set 150 of RSVP devices (e.g., routers). Devices in the set 150 may interact with a non-RSVP device 140. Shared key logic 100 may be, for example, a dynamic group key manager, a dynamic group key server, and so on. The presence of non-RSVP device 140 in a path between router 130 and router 110 indicates that the conventional hop-by-hop RSVP security may provide an undesirable security environment. While router 140 is identified as a non-RSVP device, in another environment or configuration router 140 may be an RSVP-capable device that is simply not a member of set 150 or that is not performing RSVP security. Example apparatus, routers, and methods described herein facilitate securing RSVP using group keys in these different environments.

Figure 2:
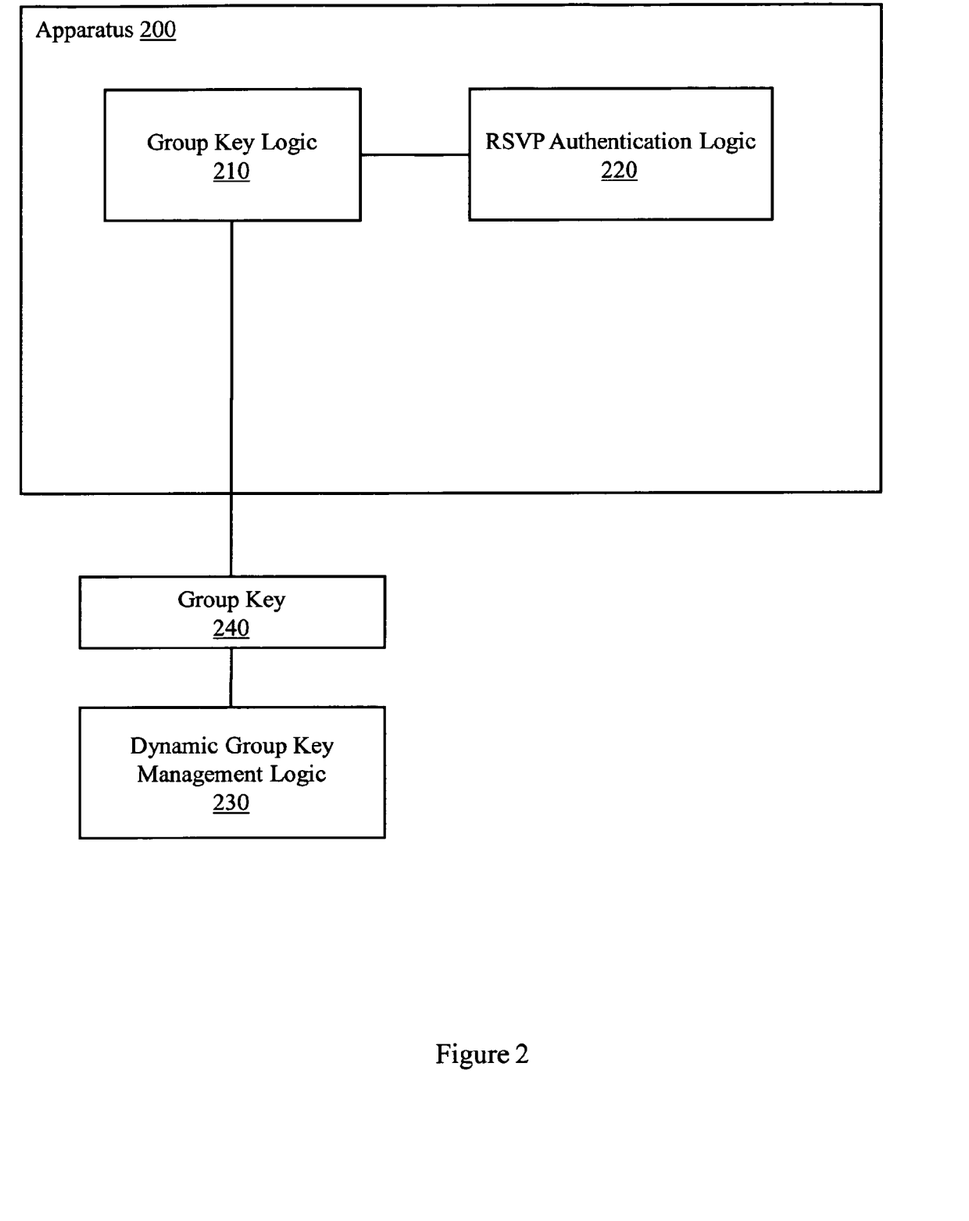
FIG. 2 illustrates an example apparatus associated with securing RSVP using dynamic group keying.

FIG. 2 illustrates an apparatus 200 that includes a group key logic 210. Apparatus 200 may be, for example, an RSVP-capable router. Group key logic 210 may interact with a dynamic group key management logic 230. Dynamic group key management logic 230 may provide group key management using different key management approaches. For example, dynamic group key management logic 230 may employ approaches including Group Domain of Interpretation (GDOI), Group Secure Association Key Management Protocol (GSAKMP), and so on. Dynamic group key management logic 230 may provide a group key 240 to apparatus 200. Dynamic group key management logic 230 may also provide the group key 240 to a set of RSVP-capable routers. The group key 240 may take different forms. For example, the group key 240 may be a data encryption key, a data integrity key, key encryption key, and so on.

Apparatus 200 may also include an RSVP authentication logic 220 to authenticate received RSVP messages. Authenticating a message involves determining whether the message was generated by a certain device that is authorized to do so (e.g., member of trusted group of RSVP-capable routers). In one example, RSVP authentication logic 220 may determine whether a received RSVP message was provided by a member of the set of RSVP-capable routers using implicit authorization. Implicit authorization depends on the group key 240 and/or on other information intrinsic to the apparatus 200. Implicit authorization does not rely on a challenge/response protocol. Thus, RSVP authentication logic 220 will not issue a challenge to a providing device and will not expect a response to the never-issued challenge. Conventional systems may have relied on a challenge/response protocol.

Figure 3:
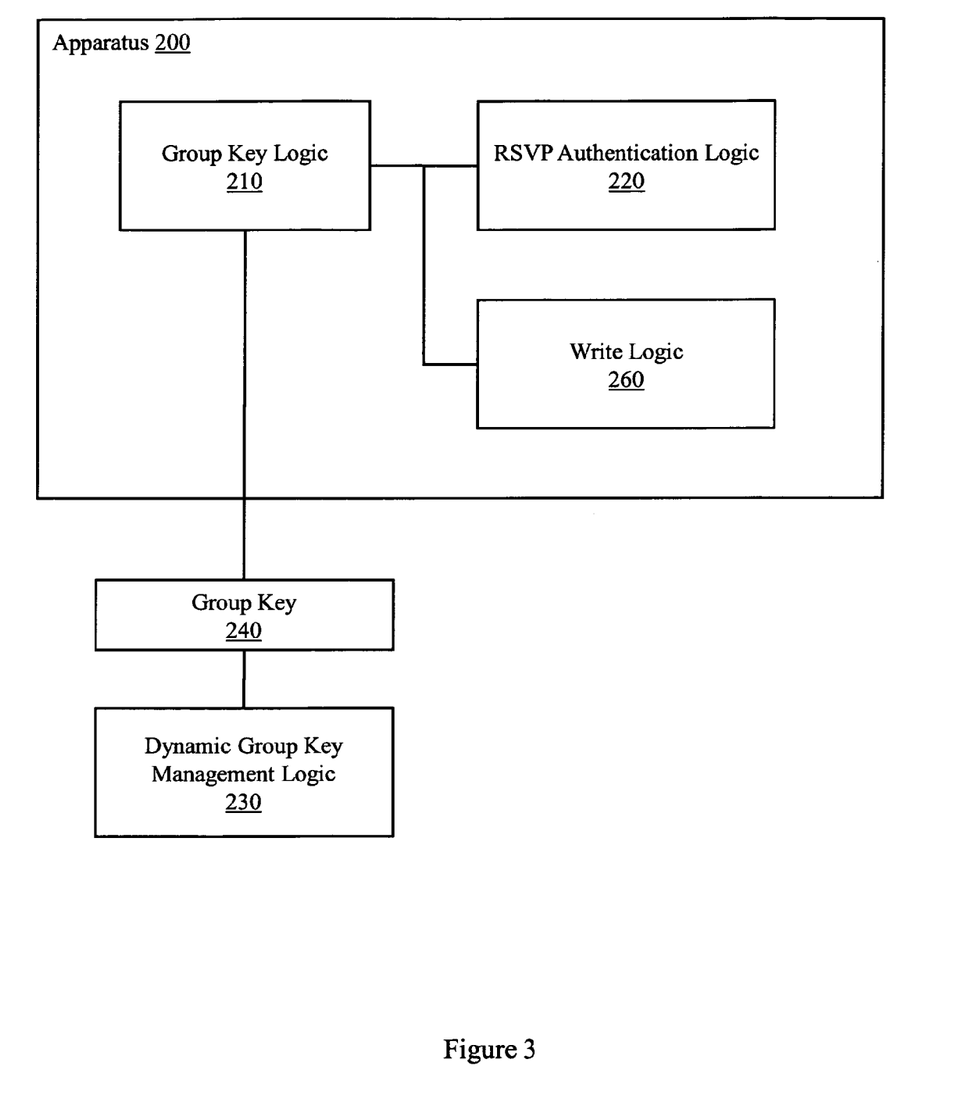
FIG. 3 illustrates another example apparatus associated with securing RSVP using dynamic group keying.

FIG. 3 illustrates apparatus 200 configured with a write logic 260. Write logic 260 may apply a cryptographic transform to an outgoing RSVP message. The outgoing RSVP message may be provided to a member of a set (e.g., trusted group) of RSVP-capable routers. Although an outgoing RSVP message may be intended for an RSVP-capable device, apparatus 200 may not know the identity of its next RSVP neighbor. For example, a PATH message may be discovering a route or configuration and the router may not know to which next RSVP device (e.g., router, server) it will be delivered. The write logic 260 may determine whether to apply a cryptographic transform to the outgoing RSVP message based, at least in part, on the group key 240. Conventionally this may have broken RSVP security. However, apparatus 200 may provide a message to an RSVP-capable device through a non-RSVP-capable device when both RSVP-capable devices are members of the trusted group and both received group key 240. In one example, the write logic 260 determines how to apply a cryptographic transform to the outgoing RSVP message based, at least in part, on the group key. The outgoing message may be, for example, a unicast message, or a multicast message.

Figure 4:
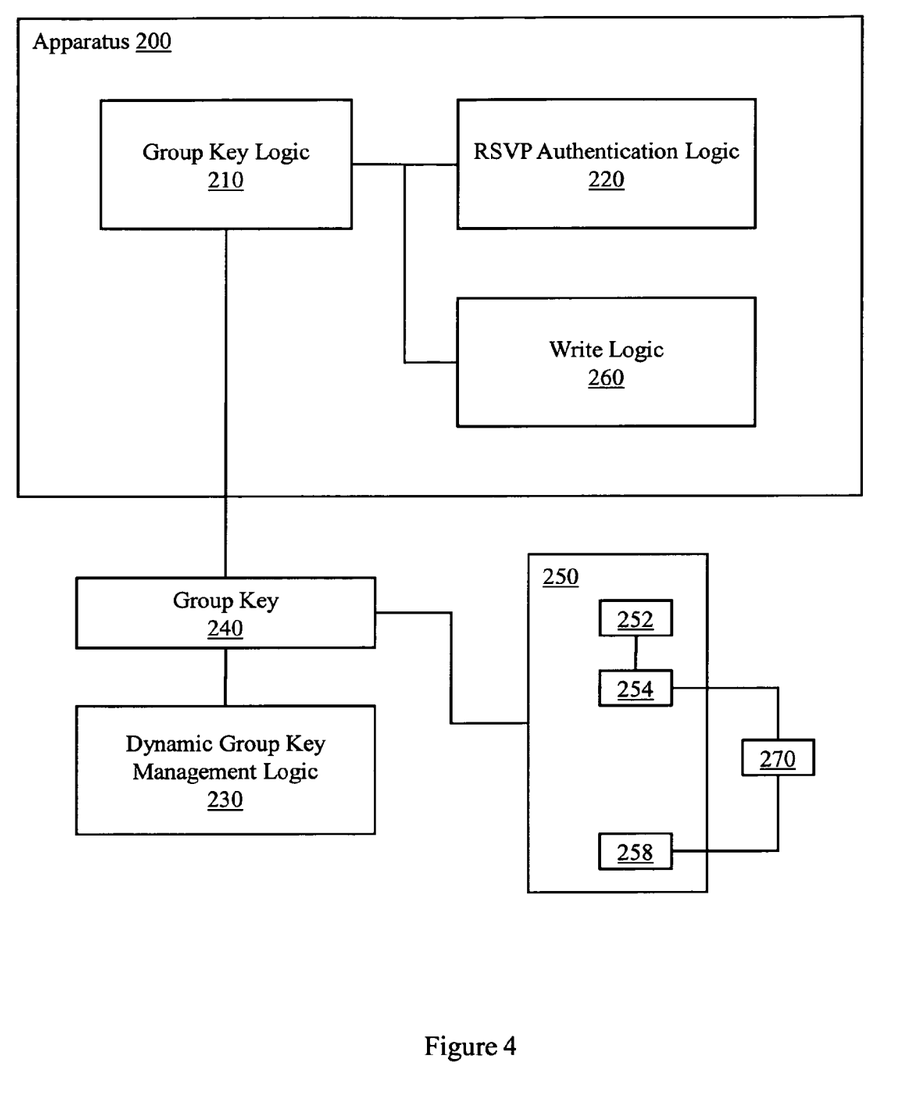
FIG. 4 illustrates another example apparatus associated with securing RSVP using dynamic group keying.

FIG. 4 illustrates apparatus 200 interacting with a set 250 of RSVP-capable routers. Apparatus 200 and/or other members of set 250 may also interact with a non-RSVP capable router 270. Set 250 may include an RSVP-capable router 252, an RSVP-capable router 254, and an RSVP-capable router 258. Apparatus 200 and routers 252, 254, and 258 may all receive group key 240 from dynamic group key management logic 230. However, non-RSVP router 270 will not receive group key 240. Dynamic group key management logic 230 may have pre-established a trusted group of routers and may not have included router 270. A route from router 252 to the reservation destination (via router 258) may traverse a non-RSVP hop that includes non-RSVP router 270. Thus, apparatus 200 and/or other RSVP-capable routers may process a message that in a previous hop visited a non-RSVP-capable router. Similarly, apparatus 200 and/or other RSVP-capable routers may process a message that in a subsequent hop will visit a non-RSVP-capable router 270. Since the members of the trusted group of routers have access to the group key 240, traversing a non-RSVP-capable router 270 does not compromise the security described and claimed herein.

The dynamic group key management logic 230 may not provide the group key management itself but may, in one example, control a dynamic group keying infrastructure to provide the group key. The dynamic group keying infrastructure may be, for example, an Internet Engineering Task Force (IETF) multicast security (MSEC) Group Controller/Key server. In one example, the dynamic group key management logic 230 may control membership in the set 250 of RSVP-capable routers and/or may selectively update the group key 240.

Figure 5:
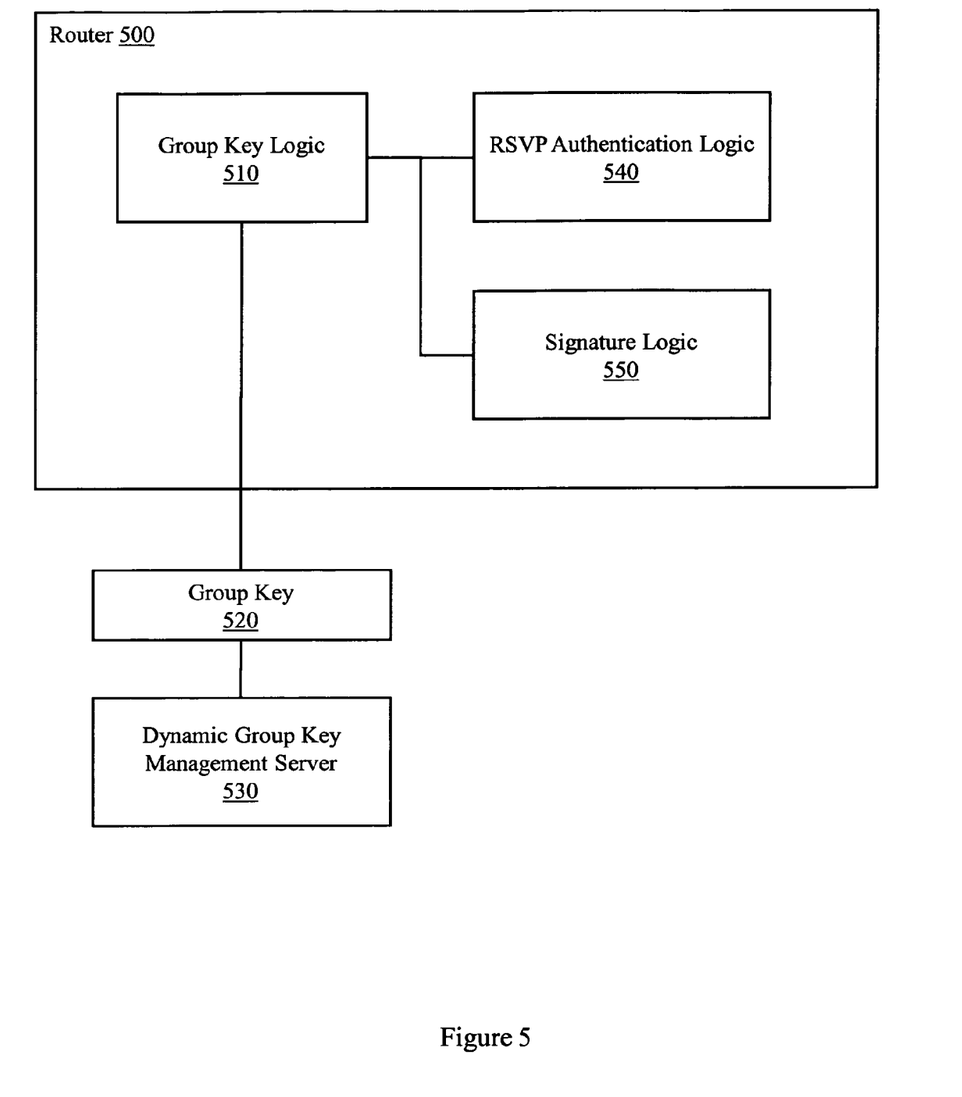
FIG. 5 illustrates an example router associated with securing RSVP using dynamic group keying.

FIG. 5 illustrates a router 500. The router 500 includes a group key logic 510 to receive a group key 520 from a dynamic group key management server 530 that provides the group key to members of a set of resource reservation protocol (RSVP) capable routers. The router 500 includes an RSVP authentication logic 540 that is to determine whether a received RSVP message was provided by a member of the set of RSVP-capable routers. The determination may be made using implicit authorization and thus may be based at least in part, on the group key, and may be performed in isolation from a challenge packet and a response packet.

Router 500 includes a signature logic 550 to apply a cryptographic transform to an outgoing RSVP message. The outgoing RSVP message may be intended for a member of the set of RSVP-capable routers. The signature logic 550 is to determine whether to apply a cryptographic transform to the outgoing RSVP message based, at least in part, on the group key. In one example, the set of RSVP-capable routers with which router 500 is associated may interact with (e.g., receive messages from, provide messages through) a non-RSVP capable router. Thus, a previous hop traveled by a received RSVP message may be associated with a non-RSVP-capable router, and a subsequent hop traveled by an outgoing RSVP message may be associated with a non-RSVP-capable router. Coupling dynamic group keying for a trusted set of RSVP-capable routers with router-based RSVP security mitigates issues with this mixed environment.

Figure 6:
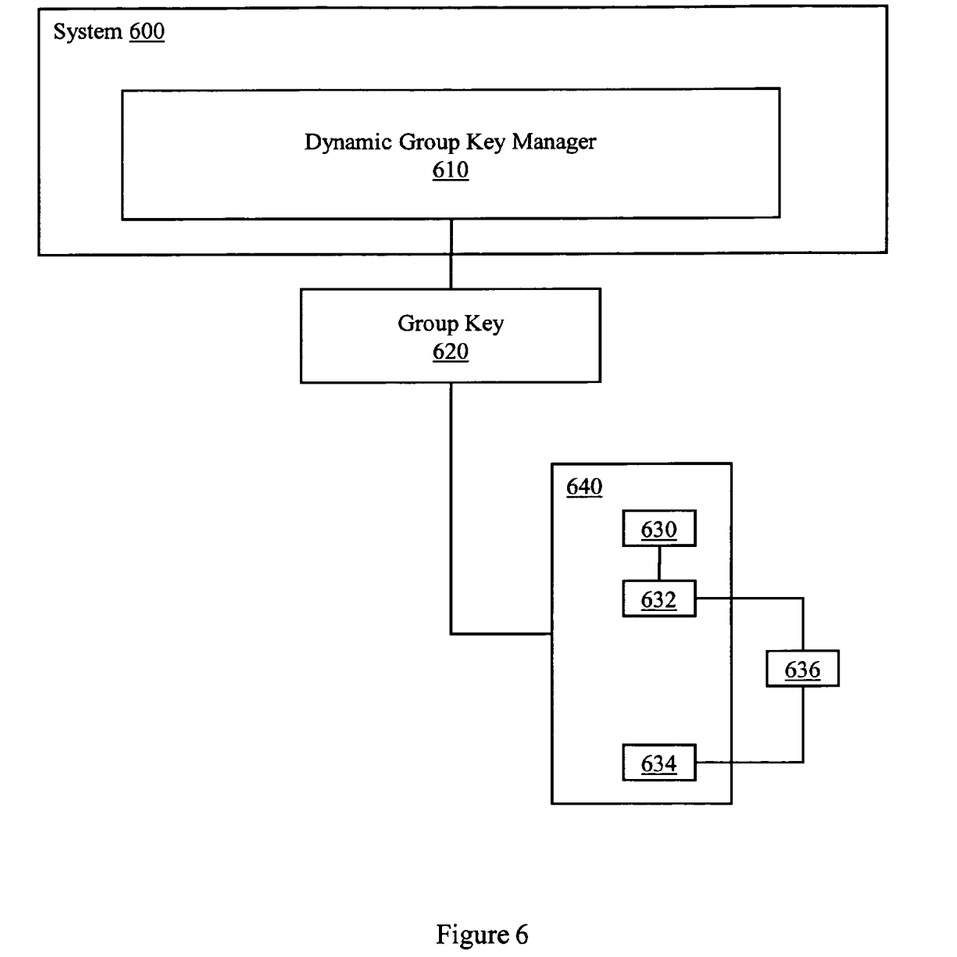
FIG. 6 illustrates an example system associated with securing RSVP using dynamic group keying.

FIG. 6 illustrates a system 600 that includes a dynamic group key manager 610. The dynamic group key manager 610 is to provide dynamic group key management for a set 640 of RSVP-capable routers. The set 640 is to include members that are to act as trusted members of the group and that are to perform router-based RSVP security. Thus, the dynamic group key management is to include distributing a group key 620 to members (e.g., 630, 632, 634) of the trusted group of RSVP-capable routers. In one example, the dynamic group key manager 610 is to control membership in the trusted group by establishing membership in the trusted group, by selectively adding a member(s) to the trusted group, and by selectively removing a member(s) from the trusted group. Note that members of the set 640 may interact with a router 636 that is not a member of the set 640. In one example, the router 636 may be an RSVP-capable router that is simply not a part of the group while in another example the router 636 may not be RSVP-capable. In either case, the group key 620 will not be provided to router 636.

Figure 7:
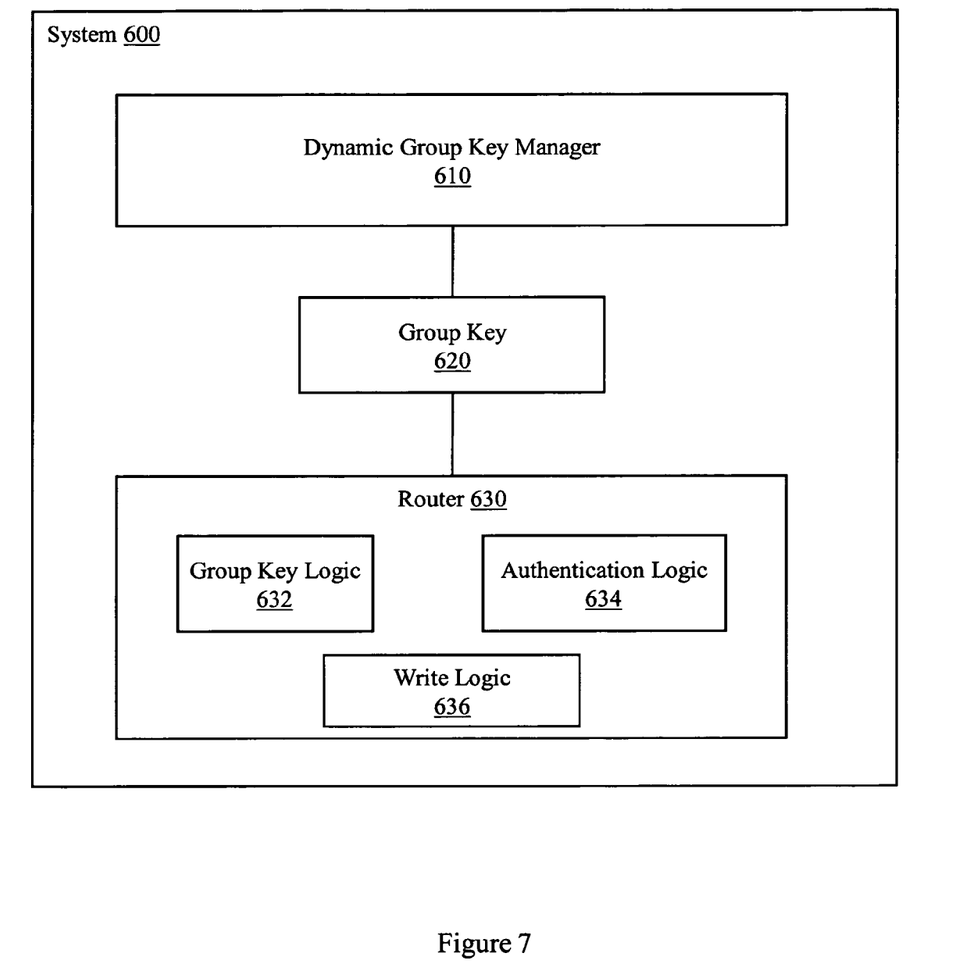
FIG. 7 illustrates an example system associated with securing RSVP using dynamic group keying.

FIG. 7 illustrates an embodiment of system 600 that includes a router 630. While a single router 630 is illustrated, it is to be appreciated that in one example system 600 may include multiple routers. The router 630 includes a group key logic 632 to receive the group key 620 and an authentication logic 634 to implicitly authenticate a received RSVP message based, at least in part, on the group key 620 and not based at all on a challenge/response protocol. Thus, the authentication logic 634 is to implicitly authenticate the received RSVP message based on the group key and in isolation from a signal associated with an exchange of a challenge packet and a response packet. In one example the router 630 may include a write logic 636 to apply a cryptographic transform to an outgoing RSVP message to be provided to a member of the set of RSVP-capable routers. The cryptographic result provided by the write logic 636 is based, least in part, on the group key 620.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 8:
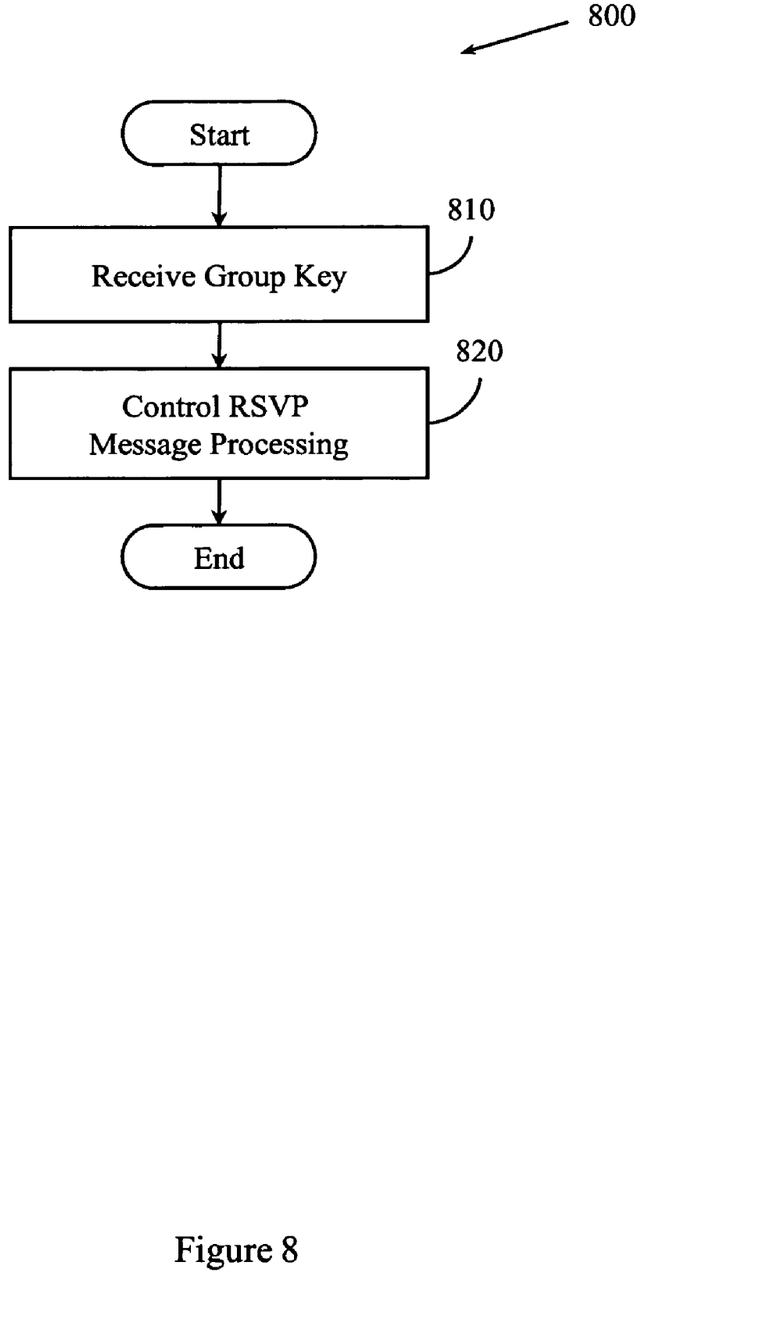
FIG. 8 illustrates an example method associated with securing RSVP using dynamic group keying.

FIG. 8 illustrates a method 800. Logic may be encoded in a tangible medium for execution, and when executed it may perform method 800. Method 800 may include, at 810, receiving a group key that is provided to a set of RSVP-capable routers. Thus, method 800 may be performed in an RSVP-capable router. The group key may be provided by a dynamic group key management process. Thus, method 800 describes a "client-side" (e.g., router-based) method associated with securing the RSVP protocol using dynamic group key management. Therefore, method 800 may also include, at 820, selectively controlling processing of an RSVP message in an RSVP-capable router based, at least in part, on the group key. The control may include, for example, authenticating a received message, apply a cryptographic transform to an outgoing message, modifying a received message before forwarding the message, and so on. Authenticating the received message may include, for example, determining whether the received message was provided by a member of a trusted group of RSVP devices that has an up-to-date group key. Applying a cryptographic transform to an outgoing message may include, for example, adding a piece of security related data to a message. A message may be modified by, for example, changing an address.

While FIG. 8 illustrates various actions occurring in serial, it is to be appreciated that various actions illustrated in FIG. 8 could occur substantially in parallel. By way of illustration, a first process could receive group keys while a second process could control RSVP message processing. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 800. While executable instructions associated with method 800 are described as being stored on a computer-readable medium, it is to be appreciated that executable instructions associated with other example methods described herein may also be stored on a computer-readable medium.

Figure 9:
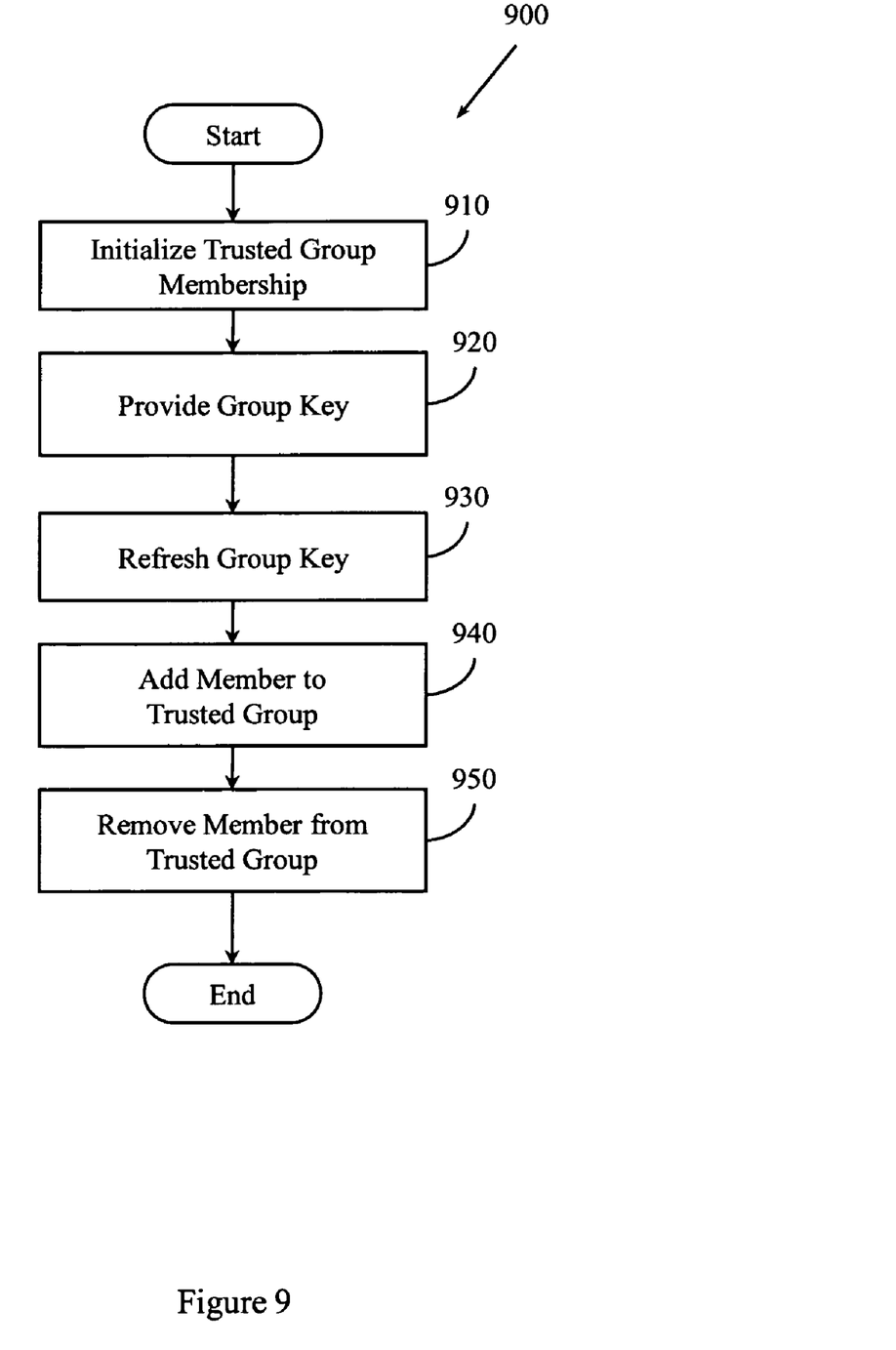
FIG. 9 illustrates an example method associated with securing RSVP using dynamic group keying.

FIG. 9 illustrates a method 900 associated with securing an RSVP using dynamic group key management. The dynamic group key management may be provided by a dynamic group key process operating on a dynamic group keying infrastructure. This process may run, for example, on a dynamic group key server. The process may perform method 900. Method 900 may include, at 910, initializing membership in a set of RSVP-capable routers. The set of RSVP-capable routers are to function as a trusted group and thus are responsible for performing appropriate RSVP processing, for performing appropriate admission control, for performing appropriate resource reservation, and so on. Additionally, members of the trusted group are trusted to not disrupt or destroy the integrity of the trusted group.

Method 900 also includes, at 920, providing a group key to members of the set of RSVP-capable routers. Providing the group key may include, for example, a broadcast distribution to members of the set of RSVP-capable routers, a hop-by-hop distribution, and so on. In one example, a member of the set of RSVP-capable routers may perform method 900 and function as a dynamic group key manager. In another example, a separate device may perform method 900. In yet another example, the dynamic group key management may be performed as a distributed process that is shared between members of the set of RSVP-capable routers. The dynamic key management may include having method 900, at 930, periodically refresh the group key. Refreshing the group key may include, for example, providing a data encryption key, providing a data integrity key, providing a key encryption key, providing other encryption material, and so on.

Membership in the set of RSVP-capable routers may not be static. Routers may be added and/or removed at various times for various reasons. Thus, method 900 may include, at 940, adding a member to the set of RSVP-capable routers and, at 950, removing a member from the set of RSVP-capable routers. A member may be added to a trusted group by, for example, updating a data structure accessed by method 900 and by providing a key to the newly added router. A member may be removed from a trusted group by, for example, updating a data structure accessed by method 900, generating a new group key, and distributing the new group key to the remaining members of the trusted group but not to the newly removed member.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. Logic encoded in a non-transitory computer-readable medium storing one or more sequences of instructions which, when executed by one or more processors, cause the one or more processors to perform:

receiving a group key from a dynamic group key management process that provides the group key to members of a set of resource reservation protocol (RSVP)-capable devices, wherein receiving a group key from a dynamic group key management logic establishes membership with the set of RSVP-capable devices; and selectively controlling processing of an RSVP-capable device based, at least in part, on the group key;

determining, based at least in part on the group key, and without issuing or exchanging a challenge packet and a response packet, whether a received RSVP message was provided by a member of the set of RSVP-capable devices or by a non-RSVP-capable device.

2. The logic of claim 1, further comprising instructions which, when executed, cause the one or more processors to perform:

periodically receiving a refreshed group key.

3. The logic of claim 2, wherein the instructions for selectively controlling processing of an RSVP message in an RSVP-capable device further comprise instructions which, when executed by the one or more processors, cause the one or more processors to perform authenticating the received RSVP message.

4. A non-transitory computer readable storage medium comprising one or more sequences of instructions which, when executed by one or more processors, cause the one or more processors to perform:

receiving a group key from a dynamic group key management logic that provides the group key to members of a set of resource reservation protocol (RSVP)-capable devices, wherein receiving a group key from a dynamic group key management logic establishes membership with the set of RSVP-capable devices; and determining, using implicit authorization, whether a received RSVP message was provided by a member of the set of RSVP-capable devices or by a non-RSVP-capable device, where the implicit authorization depends, at least in part, on the group key, and where the implicit authorization is performed in isolation from a challenge/response protocol;

wherein the RSVP authentication logic is to determine using the implicit authorization without issuing or exchanging a challenge packet and a response packet.

5. The non-transitory computer readable storage medium of claim 4, further comprising instructions which, when executed, cause the one or more processors to perform:
applying a cryptographic transform to an outgoing RSVP message, wherein the outgoing RSVP message is to be provided to a member of the set of RSVP-capable devices, and wherein determining whether to apply a cryptographic transform to the outgoing RSVP message is based, at least in part, on the group key.

6. The non-transitory computer readable storage medium of claim 5, wherein the cryptographic transform are applied to the outgoing RSVP message based, at least in part, on the group key.

7. The non-transitory computer readable storage medium of claim 5, wherein the outgoing RSVP message is one of, a unicast message, a broadcast message, and a multicast message.

8. The non-transitory computer readable storage medium of claim 4, wherein the set of RSVP-capable devices interacts with one of, a non-RSVP-capable router, wherein a previous hop traveled by the received RSVP message may be associated with a non-RSVP-capable router, and wherein a subsequent hop traveled by the outgoing RSVP message may be associated with a non-RSVP-capable router that is not a part of the set of RSVP-capable devices.

9. The non-transitory computer readable storage medium of claim 4, wherein the group key is one or more of, a data encryption key, a data integrity key, and a key encryption key.

10. The non-transitory computer readable storage medium of claim 4, further comprising instructions which, when executed, cause the one or more processors to perform controlling the membership in the set of RSVP-capable devices.

11. The non-transitory computer readable storage medium of claim 4, wherein the group key is selectively updated.

12. The non-transitory computer readable storage medium of claim 4, further comprising instructions which, when executed, cause the one or more processors to perform: controlling a dynamic group keying infrastructure to provide the group key.

13. The non-transitory computer readable storage medium of claim 11, wherein the group key is distributed by an Internet Engineering Task Force (IETF) multicast security (MSEC) Group Controller/Key server.

14. A computer-implemented method, comprising:
receiving a group key from a dynamic group key management logic that provides the group key to members of a set of resource reservation protocol (RSVP)-capable devices, wherein receiving a group key from a dynamic group key management logic establishes membership with the set of RSVP-capable devices; and
determining, using implicit authorization, whether a received RSVP message was provided by a member of the set of RSVP-capable devices or by a non-RSVP-capable device, wherein the implicit authorization depends, at least in part, on the group key, and wherein the implicit authorization is performed in isolation from a challenge/response protocol and without issuing or exchanging a challenge packet and a response packet;
wherein the method is performed by one or more computing devices.

15. The method of claim 14, further comprising:
applying a cryptographic transform to an outgoing RSVP message, wherein the outgoing RSVP message is to be provided to a member of the set of RSVP-capable devices, and wherein determining whether to apply a cryptographic transform to the outgoing RSVP message is based, at least in part, on the group key.

16. The method of claim 15, wherein applying a cryptographic transform to the outgoing RSVP message is based, at least in part, on the group key.

17. The method of claim 14, wherein the outgoing RSVP message is one of, a unicast message, a broadcast message, and a multicast message.

18. The method of claim 14, wherein the set of RSVP-capable devices interacts with one of, a non-RSVP-capable router, wherein a previous hop traveled by the received RSVP message may be associated with a non-RSVP-capable router, and wherein a subsequent hop traveled by the outgoing RSVP message may be associated with a non-RSVP-capable router that is not a part of the set of RSVP-capable devices.

19. The method of claim 14, wherein the group key is one or more of, a data encryption key, a data integrity key, and a key encryption key.

20. The method of claim 14, further comprising controlling the membership in the set of RSVP-capable devices.

21. The method of claim 14, wherein the group key is selectively updated.

22. The method of claim 14, further comprising controlling a dynamic group keying infrastructure to provide the group key.

23. The method of claim 21, wherein the group key is distributed by an Internet Engineering Task Force (IETF) multicast security (MSEC) Group Controller/Key server.

24. The method of claim 14, wherein the set of RSVP capable devices comprises an RSVP router.

* * * * *